United States Patent
Hata et al.

(10) Patent No.: US 9,635,552 B2
(45) Date of Patent: Apr. 25, 2017

(54) WIRELESS COMMUNICATION APPARATUS, WIRELESS COMMUNICATION METHOD, AND COMPUTER-READABLE RECORDING MEDIUM

(71) Applicant: FUJITSU LIMITED, Kawasaki-shi, Kanagawa (JP)

(72) Inventors: Yoshiaki Hata, Nishitokyo (JP); Eiji Iimori, Kawasaki (JP); Makoto Uchino, Hamura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/670,532

(22) Filed: Mar. 27, 2015

(65) Prior Publication Data

US 2015/0289136 A1 Oct. 8, 2015

(30) Foreign Application Priority Data

Apr. 8, 2014 (JP) .................................. 2014-079760

(51) Int. Cl.
*H04L 29/06* (2006.01)
*H04W 12/06* (2009.01)
(Continued)

(52) U.S. Cl.
CPC ............. *H04W 12/06* (2013.01); *H04L 63/08* (2013.01); *H04L 67/02* (2013.01); *H04W 76/025* (2013.01); *H04W 88/06* (2013.01)

(58) Field of Classification Search
CPC ... H04W 12/06; H04W 12/08; H04W 76/025; H04W 88/06; H04L 63/08; H04L 67/02; H04L 67/102
See application file for complete search history.

(56) References Cited

U.S. PATENT DOCUMENTS

| 6,735,631 B1 * | 5/2004 | Oehrke ................... H04L 41/12 709/201 |
| 2002/0129164 A1 * | 9/2002 | Van Der Meulen ............. G06F 17/30887 709/239 |

(Continued)

FOREIGN PATENT DOCUMENTS

| CN | 103596159 A | * | 2/2014 |
| JP | 2008-136150 | | 6/2008 |
| JP | 2011-166251 | | 8/2011 |

OTHER PUBLICATIONS

EESR—The Extended European Search Report of European Patent Application No. 15158885.2, mailed Sep. 2, 2015.

*Primary Examiner* — Jung Kim
*Assistant Examiner* — James J Wilcox
(74) *Attorney, Agent, or Firm* — Fujitsu Patent Center (57) ABSTRACT

A mobile terminal allocates data to a first wireless interface using a first communication network and a second wireless interface using a second communication network and executes wireless communication. The mobile terminal executes Web access to a server using the first wireless interface and acquires an authentication screen from the server. The mobile terminal executes Web access to a predetermined Web page, which is confirmed not to exist in advance, using the first wireless interface after the Web access is executed performed, and suppresses the allocation of the data to the second wireless interface when the Web access succeeds.

5 Claims, 4 Drawing Sheets

(51) Int. Cl.
*H04W 76/02* (2009.01)
*H04L 29/08* (2006.01)
*H04W 88/08* (2009.01)
*H04W 88/06* (2009.01)

(56) References Cited

U.S. PATENT DOCUMENTS

| | | | |
|---|---|---|---|
| 2004/0023650 A1* | 2/2004 | Ohta | H04W 88/04 455/422.1 |
| 2006/0135206 A1 | 6/2006 | Louks et al. | |
| 2006/0265345 A1* | 11/2006 | Christian | G06F 17/30864 |
| 2011/0295924 A1* | 12/2011 | Morris | H04L 67/02 709/202 |
| 2011/0310787 A1 | 12/2011 | Sheriff et al. | |
| 2012/0176929 A1* | 7/2012 | Choi | H04W 76/02 370/253 |
| 2013/0111038 A1* | 5/2013 | Girard | H04L 45/245 709/226 |

* cited by examiner

WIRELESS COMMUNICATION APPARATUS, WIRELESS COMMUNICATION METHOD, AND COMPUTER-READABLE RECORDING MEDIUM

CROSS-REFERENCE TO RELATED APPLICATION

This application is based upon and claims the benefit of priority of the prior Japanese Patent Application No. 2014-079760, filed on Apr. 8, 2014, the entire contents of which are incorporated herein by reference.

FIELD

The embodiments discussed herein are related to a wireless communication apparatus, a wireless communication method, and a wireless communication program.

BACKGROUND

Mobile terminals, such as smart phones, have a communication means for connection to a mobile network, such as a long-term evolution (LTE) network or a $3^{rd}$ generation (3G) network and a communication means for connection to a wireless local area network (LAN) such as a wireless fidelity (Wi-Fi) network.

In general, the mobile terminal is connected to the wireless LAN with high priority in an environment in which the mobile terminal can be connected to both the mobile network and the wireless LAN. When the wireless LAN is not available, the mobile terminal switches to the mobile network and performs communication. Some mobile terminals have a link aggregation function of performing communication using the mobile network and the wireless LAN at the same time. For example, the mobile terminal performs communication related to an application B using the wireless LAN while performing communication related to an application A using the mobile network.

Patent Document 1: Japanese Laid-open Patent Publication No. 2008-136150

Patent Document 2: Japanese Laid-open Patent Publication No. 2011-166251

However, in the above-mentioned technique, when the network is automatically switched during Web authentication which is user authentication for using Web services, the Web authentication fails.

For example, in recent years, the mobile terminal has used the Wi-Fi network and the mobile network at the same time, has allocated data to the Wi-Fi network and the mobile network, and has performed Web access. The mobile terminal accesses a Web server using the Wi-Fi network and acquires an authentication screen for using the Web services from the Web server. Then, the mobile terminal transmits authentication information as a response to the Web server using the LTE network since the quality of the Wi-Fi network deteriorates. Then, the Web server determines that Web access has been performed using a new communication network and transmits the authentication screen to the mobile terminal again.

As such, when the network used to request Web authentication is different from the network used for response, the authentication screen is retransmitted and an authentication process does not start, even though the authentication request and the authentication response are transmitted form the same mobile terminal.

SUMMARY

According to an aspect of the embodiment, a wireless communication apparatus includes a memory; and a processor that is connected to the memory, wherein the processor executes a process. The process includes allocating data to a first wireless interface using a first communication network and a second wireless interface using a second communication network and first executing wireless communication; second executing Web access to a server using the first wireless interface and acquiring an authentication screen from the server; and third executing Web access to a predetermined Web page which is confirmed not to exist in advance, using the first wireless interface after the Web access is executed by the second executing, and suppressing the allocation of the data to the second wireless interface when the Web access succeeds by the third executing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred Embodiments of the Present Invention will be explained with reference to accompanying drawings. The invention is not limited to the embodiments.

[a] First Embodiment

Overall Structure

Figure 1:
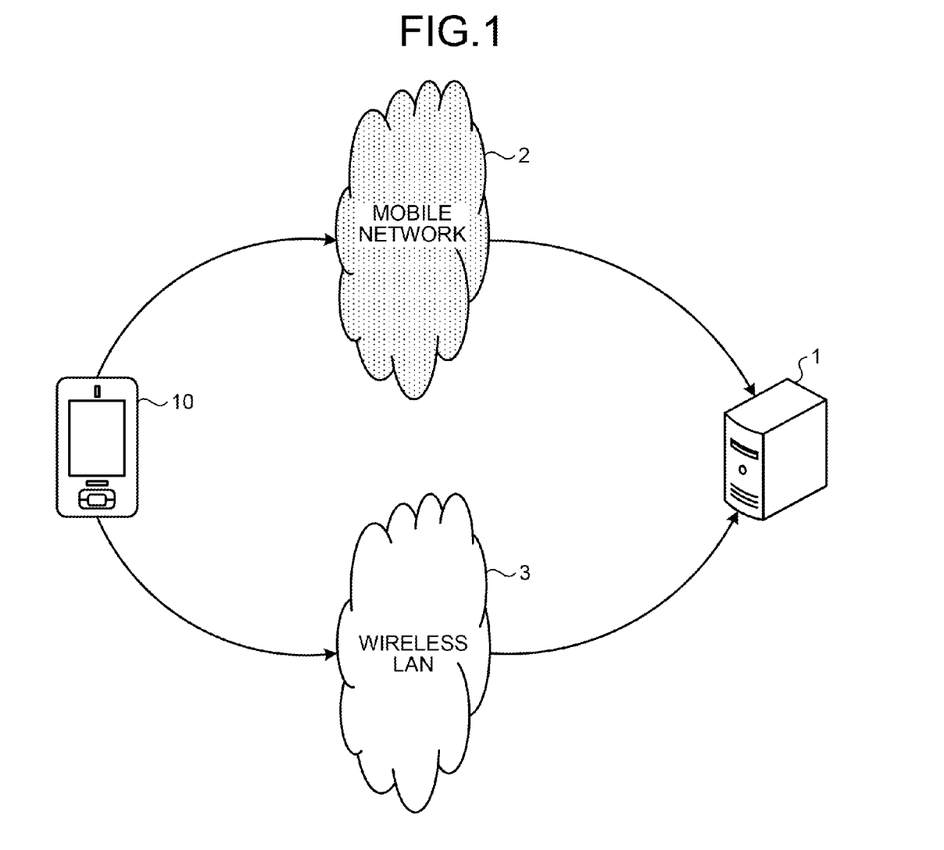
FIG. 1 is a diagram illustrating an example of the overall structure of a system according to a first embodiment.

FIG. 1 is a diagram illustrating an example of the overall structure of a system according to a first embodiment. As illustrated in FIG. 1, in the system, a mobile terminal 10 and a Web server 1 are connected so as to communicate with each other through a mobile network 2 and a wireless LAN 3.

An example of the mobile network 2 is an LTE network or a 3G network and an example of the wireless LAN 3 is a Wi-Fi network or a worldwide interoperability for microwave access (WiMAX) network. For example, the number of apparatuses is an illustrative example and is not particularly limited. In this embodiment, an example in which the Wi-Fi network and the LTE network are used will be described.

The Web server 1 is a server apparatus that provides Web services to the client and is managed by, for example, a mobile phone company. The Web server 1 performs user authentication for a client terminal and provides various Web services to the authenticated client terminal.

For example, when receiving Web access using the mobile network 2, the Web server 1 determines that the client terminal, which is an access request source, is the authenticated user on the basis of the fact that only the subscriber can use the mobile network 2. Then, the Web server 1 provides various Web services to the client terminal, without performing Web authentication.

When receiving Web access using the wireless LAN 3, the Web server 1 authenticates the user of the client terminal, which is an access request source, on the basis of the fact that the unspecified user can use the wireless LAN 3. Then, when the user is authenticated, the Web server 1 provides various Web services to the client terminal.

The mobile terminal 10 is a client terminal that executes applications to communicate with the Web server 1 and is, for example, a smart phone, a mobile phone, or a notebook personal computer. The mobile terminal 10 includes antennas corresponding to each communication network and can perform communication using the communication networks at the same time.

For example, the mobile terminal 10 determines the ratio of the Wi-Fi network to the LTE network to be 7:3 in an environment in which the quality of the Wi-Fi network is higher than the quality of the LTE network. In this case, the mobile terminal 10 transmits seven sockets through a Wi-Fi channel and transmits three sockets through an LTE channel among 10 sockets used by an application A.

That is, the mobile terminal 10 establishes a connection to the Wi-Fi network, using a Wi-Fi internet protocol (IP) address and a port number used by the application A, and the Wi-Fi IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives data using the sockets. When the communication between the mobile terminal 10 and the Web server 1 is completed, the mobile terminal 10 closes the sockets. The mobile terminal 10 performs communication using seven Wi-Fi sockets among a total of 10 sockets to transmit data.

The mobile terminal 10 establishes a connection to the LTE network, using an LTE IP address and the port number used by the application A, and the LTE IP address of the Web server 1 and the port number used by the application A. Then, the mobile terminal 10 opens the sockets and writes data to the sockets such that the Web server 1 reads the data. The Web server 1 returns a request from the mobile terminal 10 and the mobile terminal 10 receives the data using the sockets. When the communication between the mobile terminal 10 and the Web server 1 is completed, the mobile terminal 10 closes the sockets. The mobile terminal 10 performs communication using three LTE sockets among a total of 10 sockets to transmit data.

In this state, the mobile terminal 10 allocates data to a first wireless interface using the Wi-Fi network and a second wireless interface using the LTE network and performs wireless communication. Then, the mobile terminal 10 performs Web access to the Web server 1 using the first wireless interface and acquires an authentication screen from the Web server 1. Then, the mobile terminal 10 performs Web access to a non-existent Web page using the first wireless interface. When the access has succeeded, the mobile terminal 10 suppresses the allocation of data to the second wireless interface.

For example, after Web authentication using the Wi-Fi network starts, the mobile terminal 10 accesses a non-existent uniform resource locator (URL) and fixes the network used to the Wi-Fi network while an access response, such as 200 OK, is being acquired. That is, when acquiring the Web authentication screen from the Web server 1 using the Wi-Fi network, the mobile terminal 10 uses the sockets allocated to the Wi-Fi network to communicate with the Web server 1, regardless of the conditions of the network. As a result, the mobile terminal 10 can switch the network during Web authentication and prevent an authentication failure.

Hardware Configuration

Figure 2:
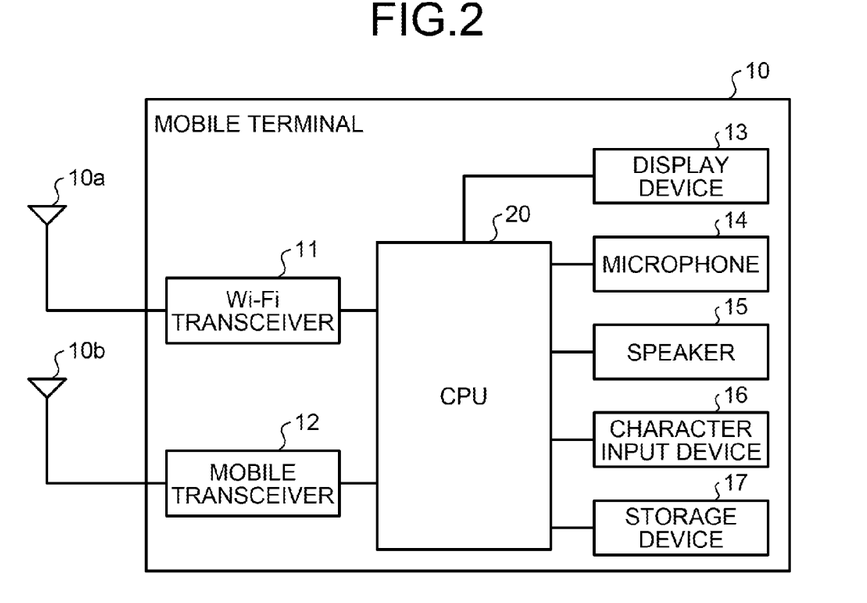
FIG. 2 is a diagram illustrating an example of the hardware configuration of a mobile terminal according to the first embodiment.

FIG. 2 is a diagram illustrating an example of the hardware configuration of the mobile terminal according to the first embodiment. As illustrated in FIG. 2, the mobile terminal 10 includes a Wi-Fi transceiver 11, a mobile transceiver 12, a display device 13, a microphone 14, a speaker 15, a character input device 16, a storage device 17, and a central processing unit (CPU) 20.

The Wi-Fi transceiver 11 performs communication through the wireless LAN 3, such as a Wi-Fi network, using an antenna 10a. A Wi-Fi IP address is set in the Wi-Fi transceiver 11. The Wi-Fi transceiver 11 establishes a connection to the Web server 1, using the IP address, and transmits and receives data.

The mobile transceiver 12 performs communication through the mobile network 2, such as an LTE network, using an antenna 10b. An LTE IP address is set in the mobile transceiver 12. The mobile transceiver 12 establishes a connection to the Web server 1, using the IP address, and transmits and receives data.

The display device 13 is, for example, a touch panel or a display and displays various kinds of information. The microphone 14 collects a voice and inputs the collected voice to the CPU 20. The speaker 15 outputs the voice input from the CPU 20.

The character input device 16 is, for example, a keyboard or a keyboard which is displayed on a touch panel, receives various inputs from the user, and outputs the inputs to the CPU 20. The storage device 17 is, for example, a memory or a hard disk and stores, for example, the programs executed by the CPU 20, the processing results which are generated by the programs executed by the CPU 20, and various tables.

The CPU 20 is a processing unit which is in charge of all of the processes of the mobile terminal 10. The CPU 20 reads a program from the storage device 17 and performs processes. For example, the CPU 20 operates a process that performs processing which will be described after FIG. 3. In addition, two or more CPUs 20 may be provided.

Functional Structure

Figure 3:
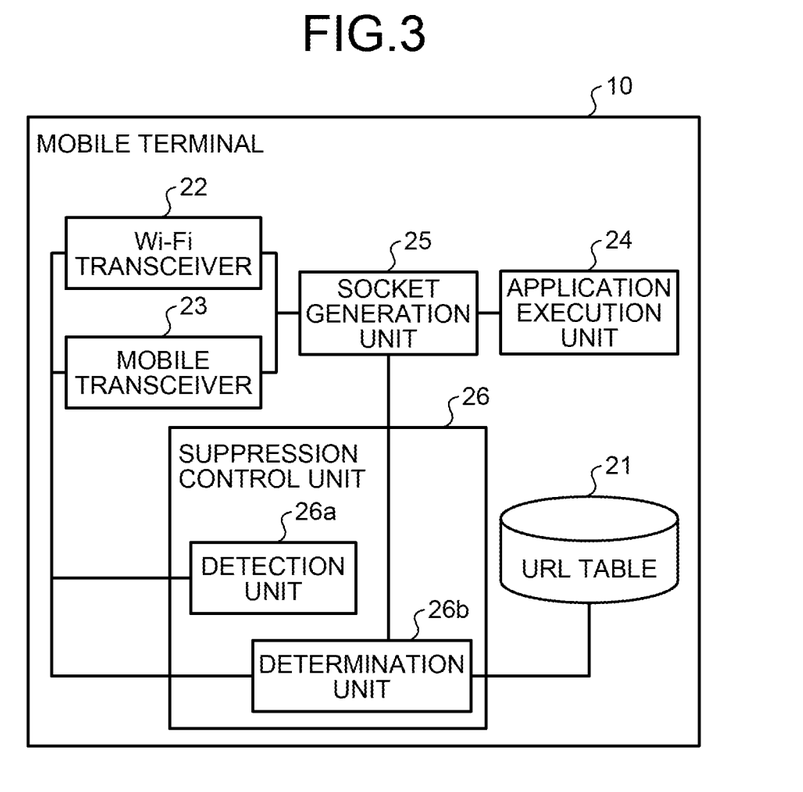
FIG. 3 is a functional block diagram illustrating the functional structure of the mobile terminal according to the first embodiment.

FIG. 3 is a functional block diagram illustrating the functional structure of the mobile terminal according to the first embodiment. As illustrated in FIG. 3, the mobile terminal 10 includes a URL table 21, a Wi-Fi transceiver 22, a mobile transceiver 23, an application execution unit 24, a socket generation unit 25, and a suppression control unit 26.

The URL table 21 stores the URLs of non-existent Web pages. The stored URL may be a predetermined URL or a URL obtained by automatically changing the URL of the Web authentication screen designated by redirection according to a predetermined rule.

The Wi-Fi transceiver 22 is a processing unit that generates the sockets to be used for the Wi-Fi network and transmits and receives data using the Wi-Fi network. Specifically, the Wi-Fi transceiver 22 establishes a connection to the Web server 1 on the Wi-Fi network and transmits data to the Web server 1 using the socket.

For example, the Wi-Fi transceiver 22 writes data to the socket using the connection which is established with the Web server 1. The data is read by the Web server 1. The Web server 1 returns the request from the mobile terminal 10 and the mobile terminal 10 receives the data using the socket. When the communication between the mobile terminal 10 and the Web server 1 is completed, the Wi-Fi transceiver 22 closes the socket.

When the Web server 1 writes data to the socket, the Wi-Fi transceiver 22 reads the data from the socket, using the connection established with the Web server 1. In this way, the Wi-Fi transceiver 22 transmits and receives data using Wi-Fi socket communication.

The mobile transceiver 23 is a processing unit that generates the sockets to be used for the LTE network and transmits and receives data using the LTE network. Specifically, the mobile transceiver 23 establishes a connection to the Web server 1 on the LTE network and transmits data to the Web server 1 using the socket.

For example, the mobile transceiver 23 writes data to the socket using the connection established with the Web server 1 and the Web server 1 reads the data. The Web server 1 returns the request from the mobile terminal 10 and the mobile terminal 10 receives the data using the socket. When the communication between the mobile terminal 10 and the Web server 1 is completed, the mobile transceiver 23 closes the socket.

When the Web server 1 writes data to the socket, the mobile transceiver 23 reads the data from the socket, using the connection established with the Web server 1. In this way, the mobile transceiver 23 transmits and receives data using LTE socket communication.

The application execution unit 24 is a processing unit that executes applications. Specifically, the application execution unit 24 reads an application program desired by the user from, for example, the storage device 17, develops the program in the memory, and executes the application, in response to an instruction from the user.

For example, when a Web access request is received from the user, the application execution unit 24 performs Web access to the Web server 1 using the Wi-Fi transceiver 22 or the mobile transceiver 23. In this case, the socket generation unit 25 allocates the socket used for the Web access to any one of the networks. Then, when the Web access to the Web server 1 is performed using the mobile transceiver 23, the application execution unit 24 acquires the Web page which is desired by the user and displays the Web page on, for example, a display.

On the other hand, when the Web access to the Web server 1 is performed using the Wi-Fi transceiver 22, the application execution unit 24 acquires the Web authentication screen and displays the Web authentication screen on, for example, the display. Then, the application execution unit 24 receives the user ID or the password which is input to the Web authentication screen by the user. Then, when authentication is permitted, the application execution unit 24 acquires the Web page which is desired by the user and displays, the Web page on, for example, the display.

The socket generation unit 25 is a processing unit that generates sockets. Specifically, the socket generation unit 25 determines a socket generation ratio on the basis of the quality of the Wi-Fi network and the quality of the LTE network and generates sockets at the determined ratio. Various methods can be used to determine the socket generation ratio. For example, a table which can uniquely determine the socket generation ratio on the basis of a combination of the quality of the Wi-Fi network and the quality of the LTE network can be used.

For example, the socket generation unit 25 stores a table which specifies a unique ratio from the received signal strength indicator (RSSI) value of the Wi-Fi network and the link speed of the LTE network in, for example, a storage unit. Then, the socket generation unit 25 periodically acquires the RSSI value and the link speed and specifies the ratio to be "7:3". Then, the socket generation unit 25 generates sockets at the specified ratio, allocates communication to the Wi-Fi network and the LTE network, and performs communication using the Wi-Fi network and the LTE network at the same time.

The suppression control unit 26 is a processing unit that includes a detection unit 26a and a determination unit 26b and suppresses the allocation of the sockets using the detection unit 26a and the determination unit 26b.

The detection unit 26a is a processing unit that detects the acquisition of the Web authentication screen using the Web access with the Wi-Fi network. For example, the detection unit 26a monitors the Wi-Fi transceiver 22 and detects whether the Web authentication screen is received. Then, when detecting that the Web authentication screen is acquired through the Wi-Fi network, the detection unit 26a notifies the determination unit 26b that the Web authentication screen has been acquired.

The determination unit 26b is a processing unit that allocates the sockets to the mobile transceiver 23 when the detection unit 26a detects the acquisition of the Web authentication screen. Specifically, the determination unit 26b suppresses the allocation of the sockets to the LTE network and fixes communication to socket communication using the Wi-Fi network, regardless of the socket allocation ratio, for a period from the start of Web authentication using the Wi-Fi socket to the completion of the Web authentication.

For example, when the acquisition of the Web authentication screen is detected, the determination unit 26b attempts to access a non-existent Web page using the Wi-Fi network. When the access to the existent Web page has succeeded, the determination unit 26b outputs an instruction to suppress the allocation of the sockets to the mobile transceiver 23 to the socket generation unit 25. As a result, the mobile transceiver 23 suppresses the allocation of the socket to the mobile transceiver 23.

That is, the determination unit 26b suppresses the allocation of the sockets to the LTE network when receiving, for example, a message, such as 200 OK, even though the access to the non-existent Web page has succeeded. That is, when the Web authentication screen is transmitted as a response to the access to the non-existent Web page, the determination unit 26b determines that Web authentication is being performed, on the basis of the fact that the Web server 1 continuously transmits the Web authentication screen in response to the Web access until the Web authentication is permitted.

The determination unit 26b repeatedly performs the access to the non-existent Web page using the Wi-Fi network at a predetermined interval of, about, 5 ms. Then, the determination unit 26b suppresses the allocation of the socket to the LTE network when the Web access has succeeded and releases the suppression of the allocation of the socket to the LTE network when the Web access has failed.

That is, when the determination unit 26b performs Web access to the non-existent Web page using the Wi-Fi network and receives, for example, an error message, such as 204 Not Content, it starts the allocation of the sockets to the LTE network and resumes communication using the link aggregation function.

That is, the determination unit 26b determines that the Web authentication has ended when it does not receive the Web authentication screen, but receives a response indicating that a Web page does not exist from the Web server 1 in response to the access to the non-existent Web page.

Flow of Process

Figure 4:
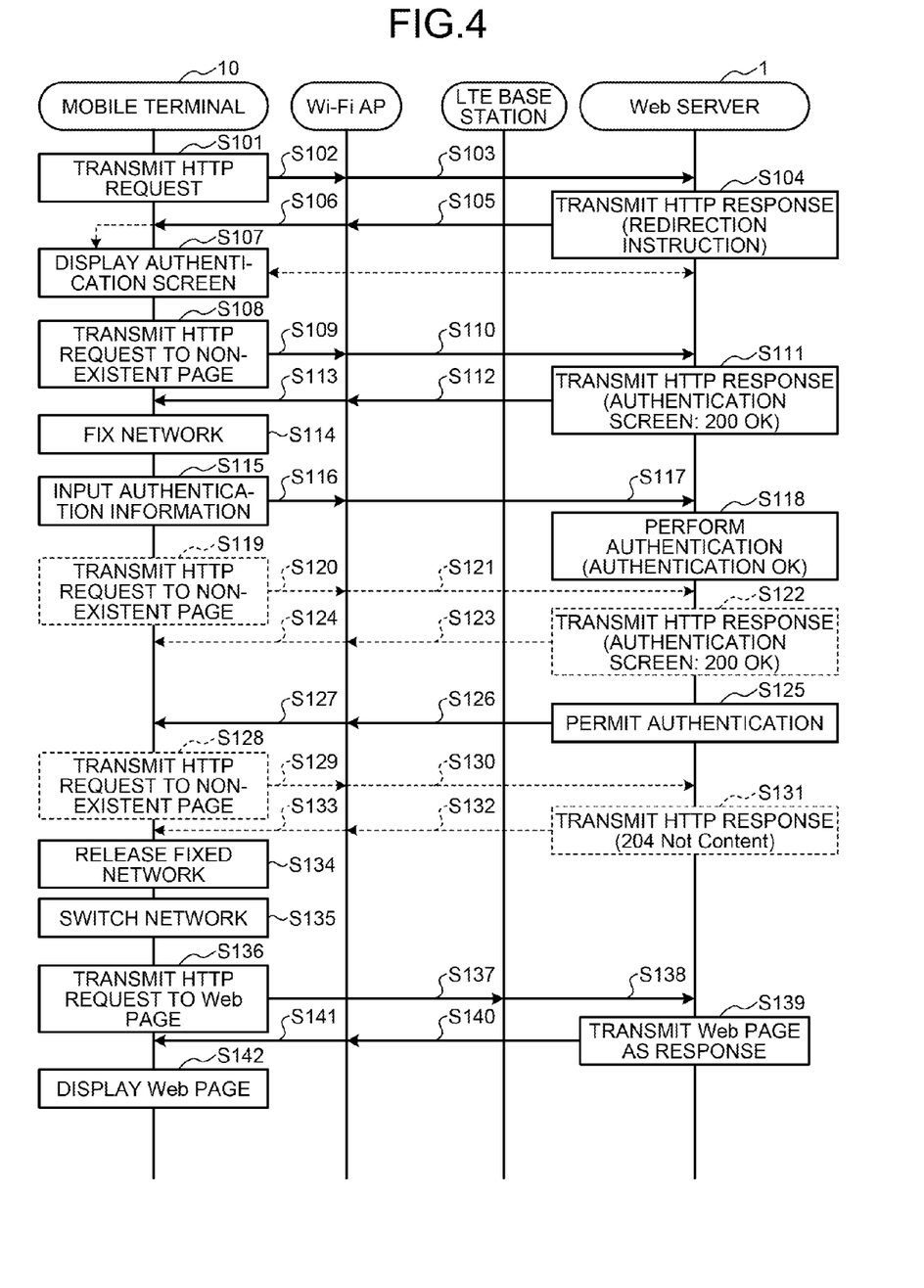
FIG. 4 is a sequence diagram illustrating the flow of a process according to the first embodiment.

FIG. 4 is a sequence diagram illustrating the flow of the process according to the first embodiment. The application execution unit 24 of the mobile terminal 10 transmits an HTTP request to the Web server 1 through a Wi-Fi access point (Wi-FiAP), using the sockets of the Wi-Fi transceiver 22 (step S101 to step S103).

Then, the Web server 1 transmits an HTTP response including a Web authentication screen redirection instruction to the mobile terminal 10, which is a Web access request source, since Web access using the Wi-Fi network is performed (step S104 to step S106). Then, the application execution unit 24 of the mobile terminal 10 performs redirection and acquires the Web authentication screen from the Web server 1 (step S107).

When the acquisition of the Web authentication screen is detected, the suppression control unit 26 of the mobile terminal 10 transmits an HTTP request for a non-existent Web page to the Web server 1 through the Wi-FiAP (step S108 to step S110).

Then, the Web server 1 determines that the mobile terminal 10 which has not passed Web authentication performs the Web access and returns an authentication screen, such as 200 OK, as an HTTP request to the mobile terminal 10 (step S111 to step S113).

As a result, the suppression control unit 26 of the mobile terminal 10 outputs an instruction to suppress the allocation of the sockets to the mobile transceiver 23 to the socket generation unit 25 and fixes the communication network to the Wi-Fi network (step S114). As a result, the mobile terminal 10 performs data communication using only the sockets generated for the Wi-Fi transceiver 22. In addition, the mobile terminal 10 newly generates only the sockets for the Wi-Fi transceiver 22 during suppression control.

Then, the application execution unit 24 of the mobile terminal 10 inputs the user ID or the password received from the user to the Web authentication screen acquired in step S107 and transmits the Web authentication screen to the Web server 1 (step S115 to step S117). Then, the Web server 1 performs authentication and determines that authentication has been permitted (step S118).

In the background of the Web authentication, the suppression control unit 26 of the mobile terminal 10 transmits an HTTP request for a non-existent Web page to the Web server 1 through the Wi-FiAP and acquires 200 OK (authentication screen) (step S119 to step S124). As a result, the mobile terminal 10 maintains the suppression of the allocation of the socket to the LTE network.

Then, the Web server 1 transmits a response indicating that Web authentication has been permitted to the mobile terminal 10 through the Wi-FiAP (step S125 to step S127).

In the background of the permission response, the suppression control unit 26 of the mobile terminal 10 transmits an HTTP request for a non-existent Web page to the Web server 1 through the Wi-FiAP (step S128 to step S130).

Then, the Web server 1 determines whether the mobile terminal 10 which has passed Web authentication performs Web access and transmits an HTTP request, such as a message indicating that a Web page does not exist, as a response to the mobile terminal 10 (step S131 to step S133).

As a result, the suppression control unit 26 of the mobile terminal 10 outputs an instruction to release the suppression of the allocation of the sockets to the mobile transceiver 23 to the socket generation unit 25 and resumes the link aggregation function (step S134).

Then, the socket generation unit 25 of the mobile terminal 10 switches the network such that the ratio of the sockets allocated to the LTE network increases with the deterioration of the quality of the Wi-Fi network (step S135).

Then, the application execution unit 24 of the mobile terminal 10 transmits an HTTP request for a desired Web page to the Web server 1 (step S136 to step S138). Specifically, the application execution unit 24 transmits the HTTP request to the Web server 1 through an LTE base station, using the sockets of the mobile transceiver 23.

Then, the Web server 1 transmits the requested Web page to the mobile terminal 10, which is a Web access request source, since the mobile terminal 10 which has passed the Web authentication performs the Web access (step S139 to step S141). As a result, the mobile terminal 10 can acquire the desired Web page (step S142).

Effect

As such, in the general Web access, after the mobile terminal is connected to the Wi-Fi access point, an authentication page is displayed first. At that time, when authentication is not executed and the mobile terminal is connected to a non-existent page, a message "204 No Content" is returned. Therefore, when the mobile terminal 10 is redirected to the authentication screen and a message 200 OK is returned, the mobile terminal 10 determines that the page has changed to a Web authentication page and displays the authentication screen in a state in which Web authentication has not been performed. During the authentication process, the mobile terminal 10 temporarily fixes the internal state to one communication network in a simultaneous connection operation using link aggregation.

During the Web authentication process, the mobile terminal 10 is periodically connected to the non-existent page and determines that the authentication process has been completed when the message "204 No Content" is returned. Then, the mobile terminal 10 returns the internal state to the state in which it is connected to the Wi-Fi network and the LTE network at the same time and then continuously performs the link aggregation operation.

Therefore, when the mobile terminal 10 performs a simultaneous connection to the Wi-Fi network and the LTE3G network using the link aggregation function, it can normally perform the Web authentication process in the simultaneous connection state during Web authentication using the Wi-Fi network.

[b] Second Embodiment

The first embodiment of the invention has been described above. However, the invention is not limited to the above-described embodiment, but various modifications and changes of the invention can be made.

Non-Existent Web Page

For example, when performing Web access to the non-existent Web page, the mobile terminal 10 can check whether a Web page does not really exist using the LTE network once. In this way, since the mobile terminal 10 can check whether a Web page does not really exist, it is possible to accurately determine the time when the use of the LTE network is suppressed.

Suppression Control

For example, the mobile terminal 10 can suppress the link aggregation function for data related to Web access. Specifically, when data communication is performed while the allocation of the sockets to the LTE network is suppressed, the mobile terminal 10 performs control such that data is transmitted using the Wi-Fi network when the type of data is Web access. The mobile terminal 10 can transmit data other than the data related to Web access using the general link aggregation function.

Structure of System and Others

Each structure of the apparatus illustrated in the drawings is not always the physical structure illustrated in the drawings. That is, the components can be dispersed or integrated in an arbitrary unit. In addition, all or some of the processing functions of each apparatus can be implemented by a CPU and the program which is analyzed and executed by the CPU or they can be implemented as hardware by a wired logic.

In addition, among the processes described in this embodiment, all or some of the processes that are automatically performed may be manually performed. Alternatively, all or some of the processes that are manually performed may be automatically performed by a known method. The processing procedure, the control procedure, the specific names, and information including various kinds of data and parameters which are described in the specification and the drawings may be arbitrarily changed unless otherwise specified.

The mobile terminal 10 according to the above-described embodiment can read a wireless communication control program and execute the wireless communication control program to implement the same functions as those in the process described with reference to, for example, FIG. 3. For example, the mobile terminal 10 develops, in the memory, a program which has the same functions as the Wi-Fi transceiver 22, the mobile transceiver 23, the application execution unit 24, the socket generation unit 25, and the suppression control unit 26. Then, the mobile terminal 10 executes the program which implements the same processes as the Wi-Fi transceiver 22, the mobile transceiver 23, the application execution unit 24, the socket generation unit 25, and the suppression control unit 26 to perform the same processes as those in the above-described embodiment.

The program can be distributed through a network such as the Internet. In addition, the program can be recorded on a computer-readable recording medium, such as a hard disk, a flexible disk (FD), a CD-ROM, an MO, or a DVD and the computer can read the program from the recording medium and execute the program.

According to the embodiment, it is possible to prevent the failure of an authentication process.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a memory; and
a processor that is connected to the memory, wherein the processor executes a process including:
allocating data to a first wireless interface using a first communication network and a second wireless interface using a second communication network and first executing wireless communication through both of the first communication network and the second communication network simultaneously;
second executing Web access to a server using the first wireless interface and acquiring an authentication screen from the server; and
attempting to execute Web access to a predetermined non-existent Web page, using the first wireless interface after the Web access is executed by the second executing, and suppressing the allocation of the data to the second wireless interface until the Web access to the predetermined non-existent Web page fails by the attempting, while maintaining both of a connection through the first communication network and a connection through the second communication network.

2. The wireless communication apparatus according to claim 1,
wherein the acquiring includes acquiring the authentication screen in response to redirection from the server through the first communication network, and
when the Web access has succeeded in response to the redirection from the server through the first communication network, the suppressing includes suppressing the allocation of the data to the second communication network.

3. The wireless communication apparatus according to claim 1,
wherein the suppressing includes executing the Web access to the predetermined Web page at a predetermined interval after the Web access is executed by the second executing, and suppressing the allocation of the data to the second communication network while the Web access to the predetermined Web page has succeeded.

4. A wireless communication method comprising:
allocating data to a first wireless interface using a first communication network and a second wireless interface using a second communication network and executing wireless communication through both of the first communication network and the second communication network simultaneously, using a processor;
executing Web access to a server using the first wireless interface and acquiring an authentication screen from the server, using a processor; and
attempting to execute Web access to a predetermined non-existent Web page, using the first wireless interface after the Web access is executed, and suppressing the allocation of the data to the second wireless interface until the Web access to the predetermined non-existent Web page fails, while maintaining both of a connection through the first communication network and a connection through the second communication network, using a processor.

5. A non-transitory computer-readable recording medium having stored a wireless communication program causing a computer to execute a process comprising:
allocating data to a first wireless interface using a first communication network and a second wireless interface using a second communication network and executing wireless communication through both of the first communication network and the second communication network simultaneously;
executing Web access to a server using the first wireless interface and acquiring an authentication screen from the server; and attempting to execute Web access to a predetermined non-existent Web page, using the first wireless interface after the Web access is executed, and suppressing the allocation of the data to the second wireless interface until the Web access to the predetermined non-existent Web fails, while maintaining both of a connection through the first communication network and a connection through the second communication network.

* * * * *